F. G. WETZEL.
WAGON BRAKE OR LOCK.
APPLICATION FILED JUNE 22, 1908.

919,985.

Patented Apr. 27, 1909.

Witnesses
M. L. Skinner.
H. F. McQuay.

Inventor
F. G. Wetzel
By Watson E. Coleman
Attorney

UNITED STATES PATENT OFFICE.

FRANK G. WETZEL, OF PRAIRIE DU CHIEN, WISCONSIN.

WAGON BRAKE OR LOCK.

No. 919,985.        Specification of Letters Patent.        Patented April 27, 1909.

Application filed June 22, 1908. Serial No. 439,820.

*To all whom it may concern:*

Be it known that I, FRANK G. WETZEL, a citizen of the United States, residing at Prairie du Chien, in the county of Crawford and State of Wisconsin, have invented certain new and useful Improvements in Wagon Brakes or Locks, of which the following is a specification, reference being had to the accompanying drawings.

This invention relates to improvements in devices for braking or locking heavily loaded wagons and other vehicles when descending a hill.

The object of the invention is to provide a simple and practical device of this character which may be readily applied to the sand board or other portion of the running gear of the wagon above the front axle and which will effectively remove the strain from the axle and place it upon the center of the wagon.

With the above and other objects in view, the invention consists of the novel features of construction and the combination and arrangement of parts hereinafter fully described and claimed, and illustrated in the accompanying drawings, in which—

Figure 1:
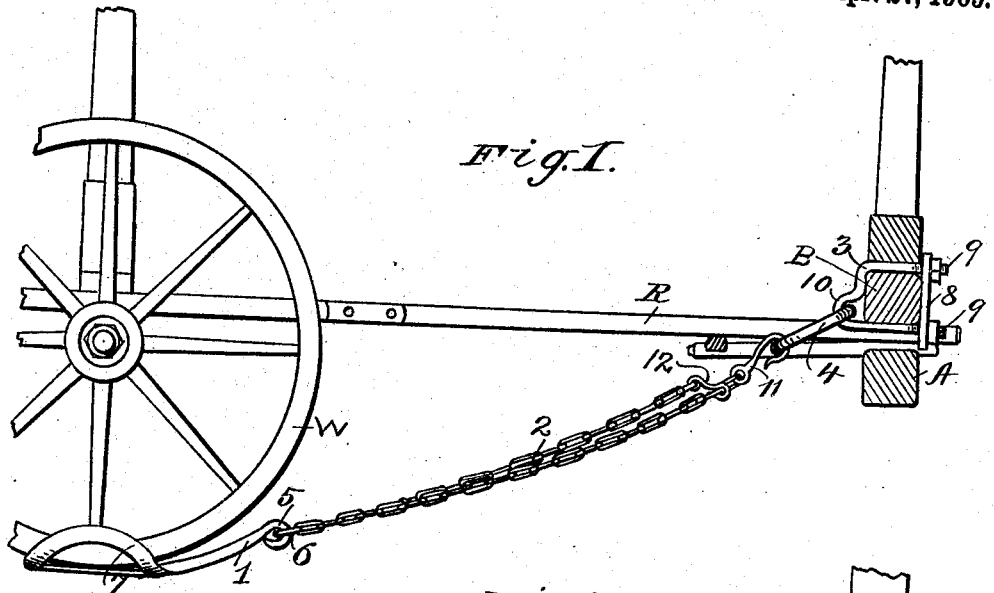
Figure 2:
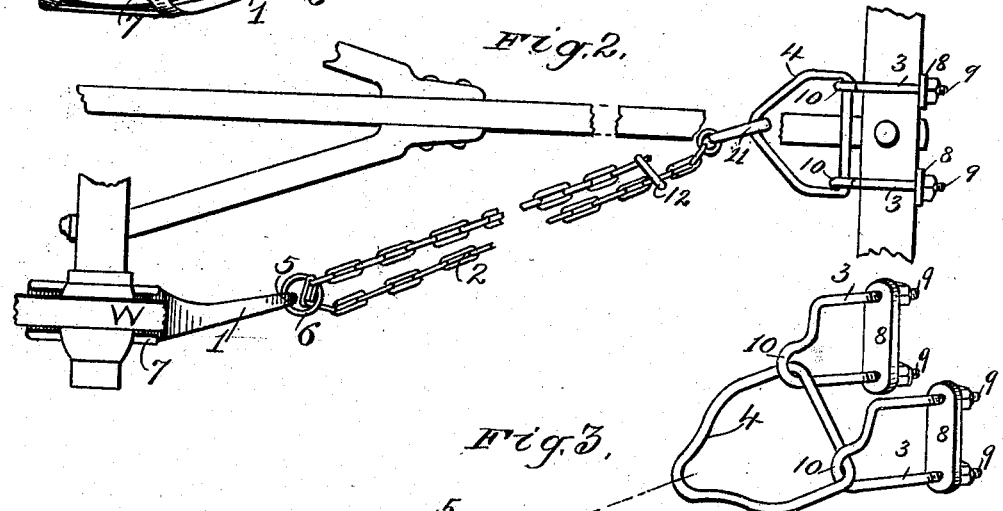
Figure 3:
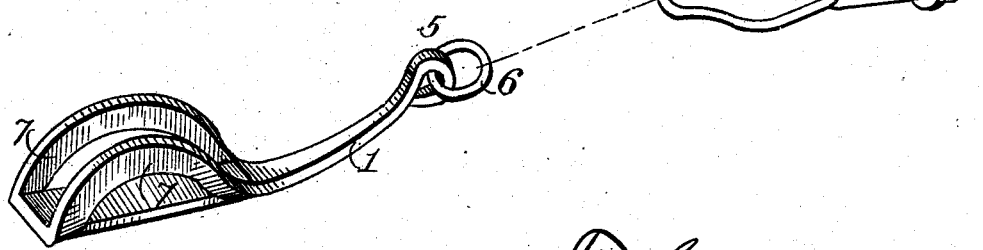

Figure 1 is a side elevation, with parts in section, of the running gear of a wagon showing the invention applied thereto; Fig. 2 is a plan view of the same; and Fig. 3 is a perspective view of the device removed from the wagon.

The invention comprises a brake shoe or chock block 1 adapted to be placed beneath one of the rear wheels W of the wagon and to be connected by a chain or other flexible connection 2 to the sand board B or other portion of the running gear of the wagon above the front axle A, the connection between the chain and the sand board being preferably composed of two clips 3 and a swinging loop or link 4. The shoe 1 is preferably composed of a flat metal plate of greater width than the tire of the wheel W and having a reduced forward end curved upwardly and bent upon itself to provide an eye 5 in which is arranged a ring 6. The wheel is retained upon the shoe 1 by upright stops 7 in the form of curved straps which extend longitudinally and have their ends secured to the body or plate of the shoe.

The clips 3 are arranged at equal distances from the center of the sand board or the king bolt of the front axle and are in the form of substantially U-shaped bolts or clips which straddle said sand board and have the threaded ends of their arms projecting through apertures in clamping plates 8 and engaged by clamping bolts 9. The closed rear portions of said clips are bent to provide loops or eyes 10 which receive the open link or loop 4 and serve as pivot bearings for the latter. The link 4 is of substantially triangular shape and it is arranged upon the reach bar R of the running gear and has its forward side or end arranged in the eyes 10. The chain or connection 2 is adjustable and as here shown has a hook 11 at one end to engage the reduced or tapered rear end of the link 4. Said chain is passed through the ring 6 upon the shoe 1 and has upon its other end a hook 12 which may be engaged with any of the links of the chain so as to vary the length of the connection and thereby properly position the shoe 1 for the reception of the wheel W.

From the foregoing it will be seen that by connecting the shoe to the sand board or other portion of the running gear of the wagon above the front axle the strain of the load will be removed from the latter and placed upon the center of the wagon. The clips 3, the link 4 and the adjustable chain or connection 2 permit the device to be quickly and easily applied to, adjusted upon and removed from the wagon and render it strong, durable and comparatively inexpensive of production.

Having thus described the invention what is claimed is:

1. The combination with the running gear of a vehicle, of a shoe to receive the rear wheel, substantially U-shaped clips arranged upon the sand board and having bearing loops or eyes, a substantially triangular link swung from said bearing eyes and a connection between said link and said shoe.

2. The combination with the running gear of a vehicle, of a shoe to receive the rear wheel, substantially U-shaped clips arranged upon the sand board and having bearing loops or eyes, a substantially triangular link swung from said bearing eyes, an eye upon said shoe, a chain having a hook at one end to detachably engage said link, said chain being passed through the eye upon the shoe, and a hook upon the other end of the chain adapted to be engaged with one of the links
5 of the latter whereby the shoe will be adjustably and detachably connected to the running gear by said chain.

In testimony whereof I hereunto affix my signature in the presence of two witnesses.

FRANK G. WETZEL.

Witnesses:
   I. D. HURLBUT,
   Z. C. SCHERLIN.